US006397200B1

(12) United States Patent
Lynch, Jr. et al.

(10) Patent No.: US 6,397,200 B1
(45) Date of Patent: May 28, 2002

(54) DATA REDUCTION SYSTEM FOR IMPROVING CLASSIFIER PERFORMANCE

(75) Inventors: Robert S. Lynch, Jr., Groton; Peter K. Willett, Coventry, both of CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/285,173

(22) Filed: Mar. 18, 1999

(51) Int. Cl.$^7$ .............................................. G06F 15/18
(52) U.S. Cl. ........................................ 706/20; 702/181
(58) Field of Search ...................... 706/40, 20; 702/181

(56) References Cited

U.S. PATENT DOCUMENTS

| | | | | |
|---|---|---|---|---|
| 4,959,870 A | * | 9/1990 | Tachikawa | 382/253 |
| 5,479,576 A | * | 12/1995 | Watanabe et al. | 706/25 |
| 5,572,597 A | * | 11/1996 | Chang et al. | 382/125 |
| 5,633,948 A | * | 5/1997 | Kegelmeyer, Jr. | 382/132 |
| 5,701,398 A | * | 12/1997 | Glier et al. | 706/41 |
| 5,790,758 A | * | 8/1998 | Streit | 706/33 |
| 5,796,924 A | * | 8/1998 | Errico et al. | 706/25 |
| 5,884,294 A | * | 3/1999 | Kadar et al. | 706/10 |
| 5,999,893 A | * | 12/1999 | Lynch, Jr. et al. | 702/181 |
| 6,009,418 A | * | 12/1999 | Cooper | 706/15 |
| 6,027,217 A | * | 2/2000 | McClure et al. | 351/224 |
| 6,035,057 A | * | 3/2000 | Hoffman | 382/159 |
| 6,278,799 B1 | * | 8/2001 | Hoffman | 382/159 |

OTHER PUBLICATIONS

Lynch Jr., et al.; "Classification using dirichlet priors when the training data are mislabeled". 1999 IEEE International Conference on Acoustics, Speech and Signal Processing, Mar. 1999, vol. 5, pp. 2973–2976.*

Lynch Jr., et al.; "Testing the statistical similarity of discrete observations using Dirichlet priors". 1998 IEEE International Symposium on Information Theory, Aug. 1998, p. 144.*

Lynch Jr., et al.; "Bayesian classification and the reduction of irrelevant features from training data". Proceedings of the 37$^{th}$ IEEE Conference on Decision and Control, Dec. 1998, vol. 2, pp. 1591–1592.*

Morris et al.; "Some solution to the missing feature problem in data classification, with application to noise robust ASR". Proceedings of the 1998 IEEE International Conference on Acoustics, Speech and Signal Processing, May 1998, vol. 2, pp. 737–740.*

Huang et al.; "An automatic hierarchical image classification scheme". Proceedings of the sixth ACM international conference on Multimedia, Sep. 1998, pp. 219–228.*

Vivarelli et al.; "Using Bayesian neural networks to classify segmented images". Proceedures of the fifth IEE International Conference on Artificial Neural Networks, Apr. 1997.*

* cited by examiner

*Primary Examiner*—Thomas Black
*Assistant Examiner*—Kelvin Booker
(74) *Attorney, Agent, or Firm*—Michael J. McGowan; James M. Kasischke; Prithvi C. Lall

(57) ABSTRACT

A data reduction method for a classification system using quantized feature vectors for each class with a plurality of features and levels. The reduction algorithm consisting of applying a Bayesian data reduction algorithm to the classification system for developing reduced feature vectors. Test data is then quantified into the reduced feature vectors. The reduced classification system is then tested using the quantized test data. A Bayesian data reduction algorithm is further provided having by computing an initial probability of error for the classification system. Adjacent levels are merged for each feature in the quantized feature vectors. Level based probabilities of error are then calculated for these merged levels among the plurality of features. The system then selects and applies the merged adjacent levels having the minimum level based probability of error to create an intermediate classification system. Steps of merging, selecting and applying are performed until either the probability of error stops improving or the features and levels are incapable of further reduction.

7 Claims, 2 Drawing Sheets

DATA REDUCTION SYSTEM FOR IMPROVING CLASSIFIER PERFORMANCE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The invention relates to a data reduction system that reduces the dimensionality of neural network training data by finding features that most improve performance of the neural network.

(2) Description of the Prior Art

The use of classification systems to classify input data into one of several predetermined classes is well known. Their use has been adapted to a wide range applications including target identification, medical diagnosis, speech recognition, digital communications and quality control systems.

Classification of sonar signals into threats and non-threats is an important task for sonar operators. Neural networks have been proposed to help accomplish this task by receiving a signal from the sonar system and analyzing characteristics of the signal for determining if the signal is originating from a vessel that is a military vessel that represents a threat or from a commercial vessel. Speed in making this determination is often of the essence.

Classification systems decide, given an input X, to which of several output classes X belongs. If known, measurable characteristics separate classes, the classification decision is straightforward. However, for most applications, such characteristics are unknown, and the classification system must decide which output class the input most closely resembles. In such applications, the output classes and their characteristics are modeled (estimated) using statistics for the classes derived from training data belonging to known classes. Thus, the standard classification approach is to first estimate the statistics from the given training data and then to apply a decision rule using these estimated statistics.

However, often there is insufficient training data to accurately infer the true statistics for the output classes which results in reduced classification performance or more occurrences of classification errors. Additionally, any new information that arrives with the input data is not combined with the training data to improve the estimates of the symbol probabilities. Furthermore, changes in symbol probabilities resulting from changes, which may be unobservable, in the source of test data, the sensors gathering data or the environment often result in reduced classification performance. Therefore, if based on the training data, a classification system maintains a near zero probability for the occurrence of a symbol and the symbol begins to occur in the input data with increasing frequency, classification errors are likely to occur if the new data is not used in determining symbol probabilities.

Attempts to improve the classification performance and take advantage of information available in test data have explored combining the test data with the training data in modeling class statistics and making classification decisions. While these attempts have indicated that improved classification performance is possible, they have one or more drawbacks which limit or prevent their use for many classification systems.

The use of Bayseian classification is taught in the prior art for combining training data with test data is found in Merhav et al, "A Bayesian Classification Approach with Application to Speech Recognition," *IEEE Trans. Signal Processing*, vol. 39, no. 10 (1991) pp. 2157–2166. In Merhav et al classification decision rules which depend on the available training and test data were explored. A first decision rule which is a Bayesian rule was identified. However, this classification rule was not fully developed or evaluated because the implementation and evaluation of the probability density functions required are extremely complex.

It is known in prior art artificial intelligence systems to reduce data complexity by grouping data into worlds with shared similar attributes. This grouping of the data helps separate relevant data from redundant data using a co-exclusion technique. These methods search saved data for events that do not happen at the same time. This results in a memory saving for the systems because only the occurrence of the event must be recorded. The co-exclusive event can be assumed.

Bayesian networks, also known as belief networks are known in the art for use as filtering systems. The belief network is initially learned by the system from data provided by an expert, user data and user preference data. The belief network is relearned when additional attributes are identified having an effect. The belief network can then be accessed to predict the effect.

A method for reducing redundant features from training data is needed for reducing the training times required for a neural network and providing a system that does not require long training times or a randomized starting configuration.

SUMMARY OF THE INVENTION

Accordingly, it is a general purpose and primary object of the present invention to provide a classification system capable of classifying data into multiple classes.

Another object of the invention is that such classification system should not include redundant and ineffectual data.

A further object of the invention is to provide a method for reducing feature vectors to only those values which affect the outcome of the classification.

Accordingly, this invention provides a data reduction method for a classification system using quantized feature vectors for each class with a plurality of features and levels. The reduction algorithm consisting of applying a Bayesian data reduction algorithm to the classification system for developing reduced feature vectors. Test data is then quantified into the reduced feature vectors. The reduced classification system is then tested using the quantized test data.

A Bayesian data reduction algorithm is further provided having by computing an initial probability of error for the classification system. Adjacent levels are merged for each feature in the quantized feature vectors. Level based probabilities of error are then calculated for these merged levels among the plurality of features. The system then selects and applies the merged adjacent levels having the minimum level based probability of error to create an intermediate classification system. Steps of merging, selecting and applying are performed until either the probability of error stops improving or the features and levels are incapable of further reduction.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
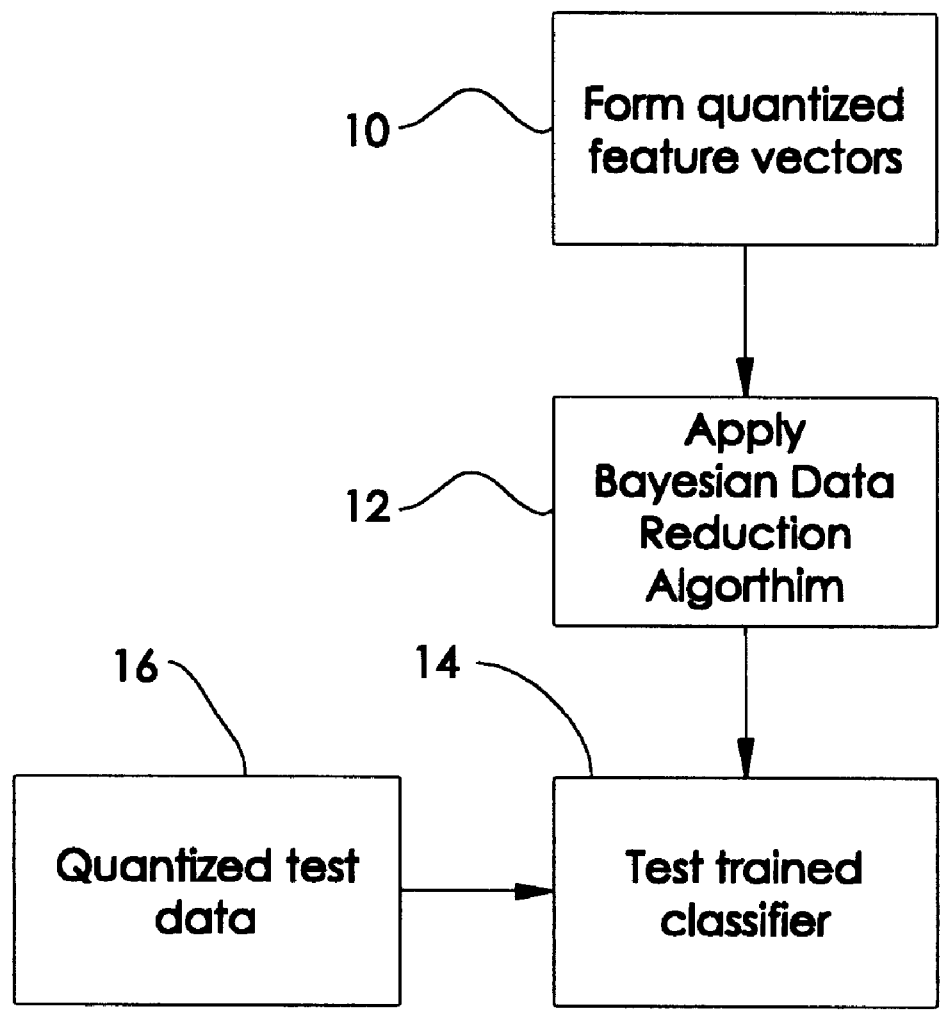
FIG. 1 is a functional block diagram showing implementation of the system of the current invention.

The data reduction system is illustrated in the FIG. 1. This figure provides a functional block diagram of the major components of the data reduction system. Intended users of this system should implement it using FIG. 1, FIG. 2, and the associated formulas and algorithms described below, by writing a computer program in the language of their choice.

In step 10 of the data reduction system all training data for each class are represented as quantized feature vectors. The classification can have two or more classes. In the case when there are two classes, there are $N_{target}$ quantized feature vectors for the target class and $N_{nontarget}$ quantized feature vectors for the nontarget class. Each feature vector is quantized by mapping it to a symbol. There are M possible symbols representing the number of discrete levels for a specific feature multiplied by the number of discrete levels for each feature. For example, a feature vector having three binary valued features can take on one of M=8 possible discrete symbols given by; (0, 0, 0), (0, 0, 1), . . . , (1, 1, 1).

In some cases, either one or all of the features will be continuous, and these features must then be discretized before the vectors are mapped to one of the M possible symbols. If a given set of thresholds does not exist for discretizing a particular feature then the feature should be discretized into a sufficient number of levels via percentiles. Ten discrete levels has been found to be adequate for most continuous features; however, other levels can be established depending on the sensitivity of the system to the feature vector and the capacity of the computer performing the data reduction. That is, to discretize a feature into ten levels its training data are used to define ten thresholds corresponding to ten percentile regions (e.g., the first threshold is found such that 10 percent of the data are less than it in value). This procedure is then repeated for the remaining continuous features. Notice also that there is no specified limit to the number of features used in the data reduction system. If the computational limits of the computer platform allow, using all known features is best. However, the same features must be used for each class, but it is not necessary that the initial quantization of each feature be the same.

In step 12 the Bayesian data reduction algorithm is simultaneously applied to the quantized training data of all classes. The algorithm uses the Dirichlet distribution as a noninformative prior. The Dirichlet represents all symbol probabilities as uniformly-distributed over the positive unit-hyperplane. Using this prior, the algorithm works by reducing the quantization fineness, M, to a level which minimizes the average conditional probability of error, P(e).

The formula for P(e) is the fundamental component of this algorithm, and it is given by $$P(e\mid X) = \sum_y \sum_X P(H_k)I_{\{z_k \le z_l\}}f(y\mid x_k, H_k) + P(H_l)I_{\{z_k > z_l\}}f(y\mid x_l, H_l) \quad (1)$$

where, in the following k and l are exchangeable;

$$z_k = f(y\mid x_k, H_k) = \frac{N_y!(N_k + M - 1)!}{(N_k + N_y + M - 1)!}\prod_{i=1}^{M}\frac{(x_{k,i} + y_i)!}{x_{k,i}!y_i!}; \quad (2)$$

N is the number of feature vectors;
k,l ∈ {target, nontarget}, and k≠l;
M is the number of discrete symbols
$H_k$ is the hypothesis;

$$H_k:p_y=p_k; \quad (3)$$

p is the vector of probabilities;

$$X \equiv (x_k,x_l); \quad (4)$$

$x_{k,i}$ is the number of symbol type i in the training data for class k and $$N_k\left\{N_k = \sum_{i=1}^{M} x_{k,i}\right\};$$

$Y_i$ is the number of symbol type i in the test data and $$N_y\left\{N_y = \sum_{i=1}^{M} y_i\right\};$$

f(y|x,H) is the probability distribution of y which depends on the parameter x for the given hypothesis, H; and
$I_{\{x\}}$ is the indicator function such that $I_{\{x\}}$=1 when x is true and $I_{\{x\}}$=0 when x is false.
For one test observation $f(y|x_k,H_k)$ becomes $$f(y\mid x_k, H_k; N_y = 1) = \frac{x_{k,i} + 1}{N_k + M}, \, y_i = 1. \quad (5)$$

Figure 2:
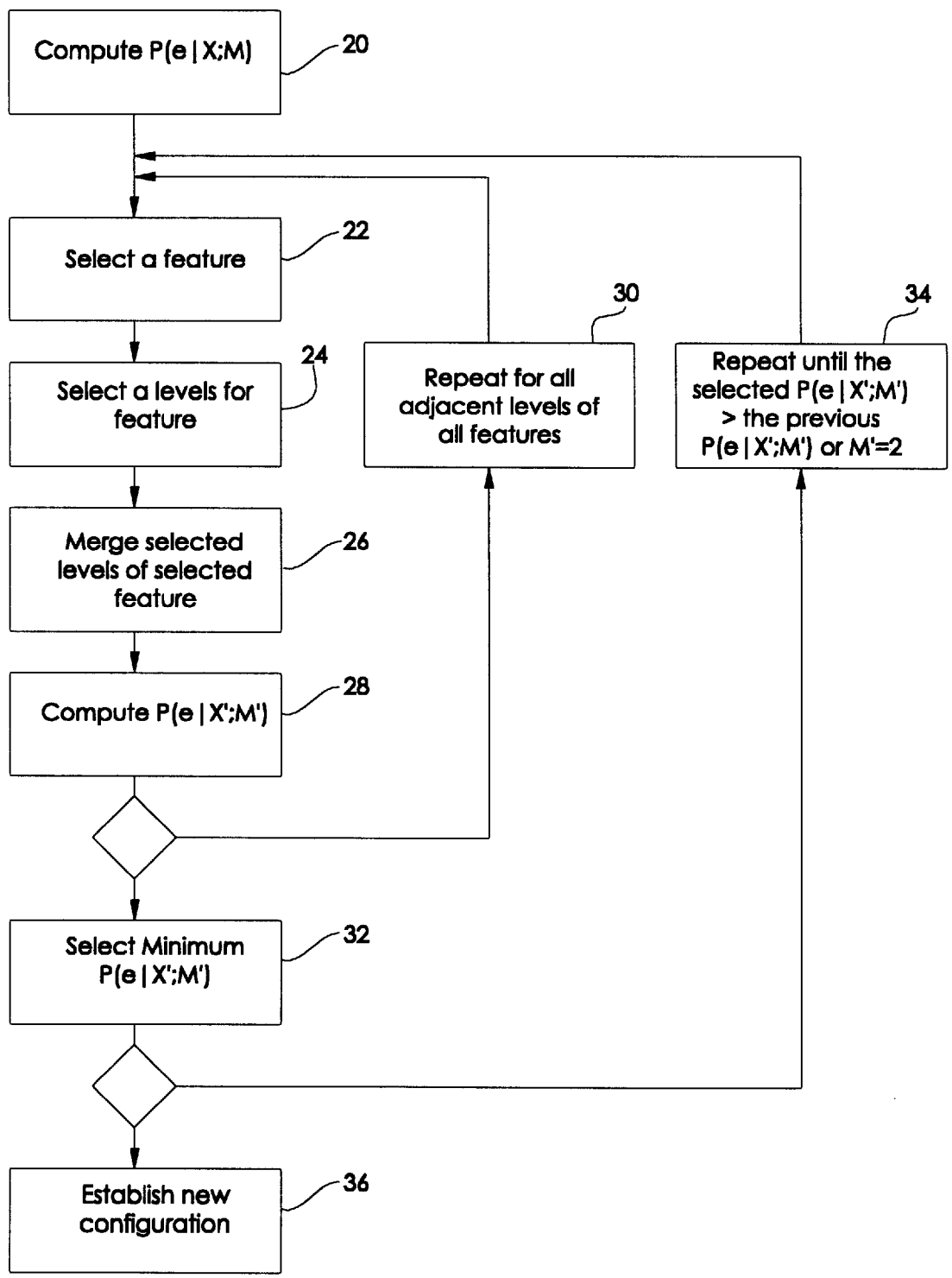
FIG. 2 is a detailed diagram of the Bayesian data reduction algorithm of the current invention.

Given formula (1), the algorithm is implemented by using the following iterative steps as shown in FIG. 2.

In step 20, using the initial training data with quantization M, formula (1) is used to compute P(e|X; M).

In step 22, a feature is selected arbitrarily, and then a two adjacent levels of the feature are selected in step 24. Step 26 merges the training data of those adjacent quantized symbols. In the binary case, quantized symbols containing a binary zero with are combined with those containing a binary one effectively removing the feature. In the continuous case, two levels are merged into one level removing the distinction between the two levels. Step 28 uses the newly merged training data, X', and the new quantization, M', and again computes P(e|X'; M'). Step 30 is a loop wherein steps 22 through 28 are repeated for all adjacent feature quantizing levels, and all remaining features.

The algorithm then selects the merged configuration having the minimum probability of error, P(e|X'; M') in step 32 from the probabilities computed in step 28. The configuration with the minimum probability of error (or maximum probability of recognition) is then used as the new training data configuration for each class (i.e., the new quantization, and its associated discrete levels and thresholds for each feature). Step 34 is another loop which repeats steps 22 through 32 until the probability of error decreases no further, or until features can no longer be reduced, i.e. M'=2.

In cases when the several probabilities are the same, the minimum can be selected arbitrarily. As an alternative the multiple configurations each having the same minimum probabilities can all be applied. By applying all configurations, computer processing time can be reduced at some increase in error. Accordingly, arbitrary selection of a single configuration is the preferred alternative.

Observe that the algorithm described above is "greedy" in that it chooses a best training data configuration at each iteration (see step 34 above) in the process of determining a best quantization fineness. A global search over all possible merges and corresponding training data configurations may in some cases provide a lower probability of error at a higher computational cost. However, a simulation study involving hundreds of independent trials revealed that only about three percent of the time did the "greedy" approach shown above produce results different than a global approach. Additionally, the overall average probability of error for the two approaches differed by only an insignificant amount.

When the Bayesian data reduction algorithm finds the new quantization fineness upon completion of step 34 in FIG. 2, this new configuration can be established as in step 36. The resulting trained classifier can be tested as step 14 of FIG. 1. To test the classifier all test data from 16 are now quantized using the remaining features, and their associated discrete levels and threshold settings that were found in step 12 for the training data.

An advantage of the Bayesian data reduction algorithm of the current invention is that it permanently reduces, or eliminates, irrelevant and redundant features (as opposed to appropriately adjusting the weights of a neural network and keeping all features) from the training data. Thus, with the current invention features are important to correct classification are highlighted. With this, the algorithm presented here does not require the long training times that can accompany a neural network, nor does it require a randomized starting configuration.

In light of the above, it is therefore understood that within the scope of the appended claims, the invention may be practiced otherwise than as specifically described.

What is claimed is:

1. A data reduction algorithm for a classification system comprising the steps of:
    forming quantized feature vectors for each class of the classification system, each quantized feature vector having a plurality of features, and each feature having data mapped into levels;
    applying a Bayesian data reduction algorithm to said classification system having quantized feature vectors to develop reduced feature vectors for said classification system;
    quantizing test data into said reduced feature vectors; and testing said classification system having said reduced feature vectors using said quantized test data in order to provide tested quantized test data.

2. The method of claim 1 wherein said step of applying a Bayesian data reduction algorithm comprises the steps of:
    computing a probability of error for the classification system having quantized feature vectors;
    merging adjacent levels for each feature in said quantized feature vectors;
    calculating level based probabilities of error for the merged adjacent levels in said plurality of features;
    selecting the minimum level based probability of error for the merged adjacent levels;
    applying the merged adjacent levels having the minimum level based probability of error to create an intermediate classification system;
    repeating said steps of merging, selecting and applying until either the most recently selected minimum level based probability of error is greater than the previously selected minimum level based probability of error or the features and levels are incapable of further reduction; and
    establishing said intermediate classification system as classification system having said reduced feature vectors.

3. The method of claim 2 wherein when at least two of said calculated level based probabilities are at said minimum, arbitrarily selecting one of said merged adjacent levels to create said intermediate classification system.

4. The method of claim 2 wherein when at least two of said calculated level based probabilities are at said minimum, arbitrarily selecting all of said merged adjacent levels to create said intermediate classification system.

5. The method of claim 3 wherein the step of merging adjacent levels merges binary levels by removing the feature.

6. The method of claim 1 further comprising the step of discretizing continuous features by mapping all continuous data for each feature into discrete levels for that feature prior to the step of forming quantized feature vectors.

7. A Bayesian data reduction algorithm for a classification system comprising:
    establishing quantized feature vectors for each class of the classification system, each quantized feature vector having a plurality of features, and each feature having data mapped into levels;
    selecting one of said plurality of features from said quantized feature vectors;
    selecting adjacent levels for said selected feature;
    merging said selected levels of said selected feature;
    computing an intermediate probability of error for said merged levels of said selected feature;
    repeating said steps of selecting one feature with another feature, selecting adjacent levels, merging said selected levels and computing intermediate probabilities of error until probabilities of error have been computed for all said adjacent levels of all said features;

selecting the merged levels with the lowest computed intermediate probability of error;

applying said merged levels to said quantized feature vectors;

repeating said steps of selecting one feature, selecting adjacent levels, merging said selected levels, computing said intermediate probabilities of error, repeating the steps for all features and levels, selecting the merged levels, and applying the merged levels until the most recent lowest computed intermediate probability of error is not less than the previous lowest computed intermediate probability of error or until only two levels exist to be merged; and providing a minimum training data configuration as the result of said step applying said merged levels after completion of said step of repeating.

* * * * *